Feb. 17, 1931.  M. J. STACK  1,793,139
MACHINE FOR AND METHOD OF MAKING CONTINUOUS CUSHIONS
Filed Nov. 18, 1927   8 Sheets-Sheet 1
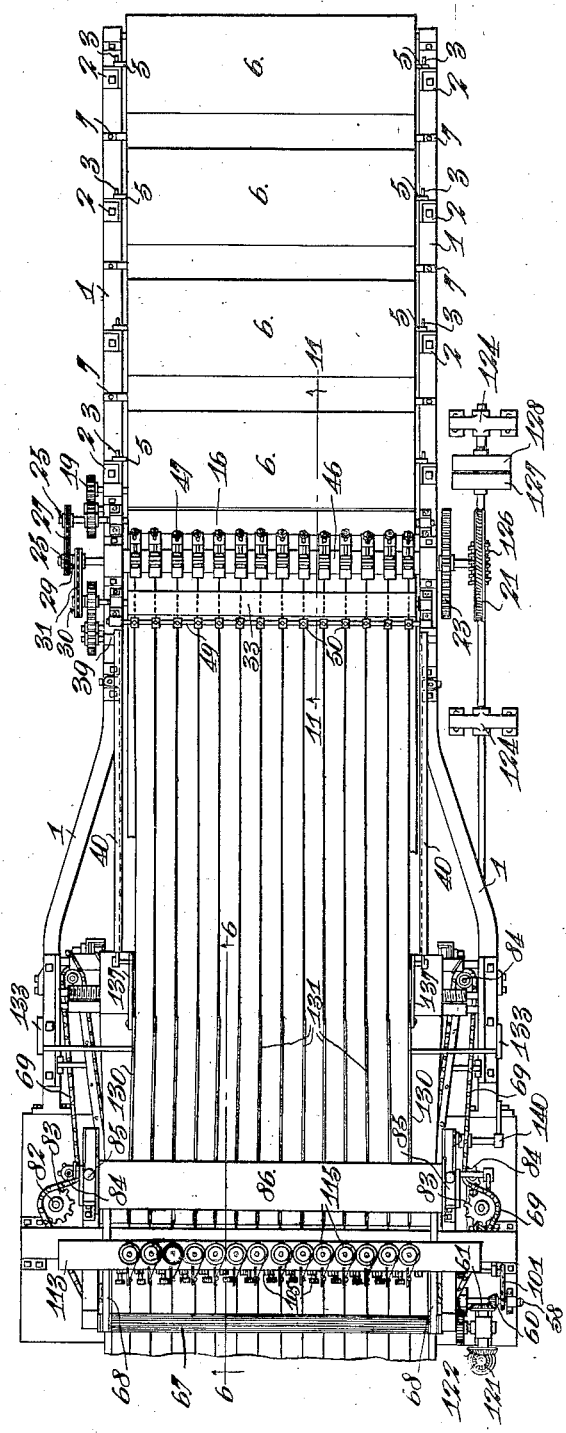
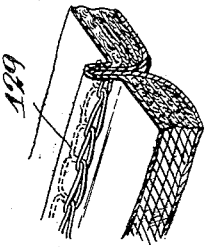
Fig. 15.
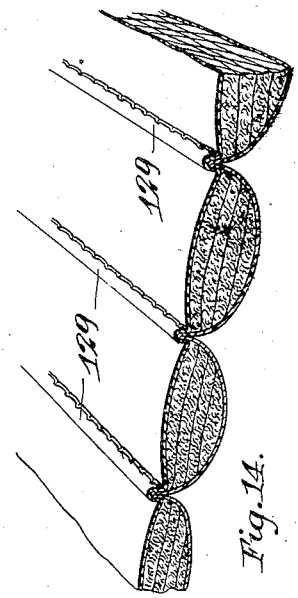
Fig. 14.
INVENTOR
*Maurice J. Stack.*
BY
*Albert E. Dieterich*
ATTORNEY Feb. 17, 1931.    M. J. STACK    1,793,139
MACHINE FOR AND METHOD OF MAKING CONTINUOUS CUSHIONS
Filed Nov. 18, 1927    8 Sheets-Sheet 2
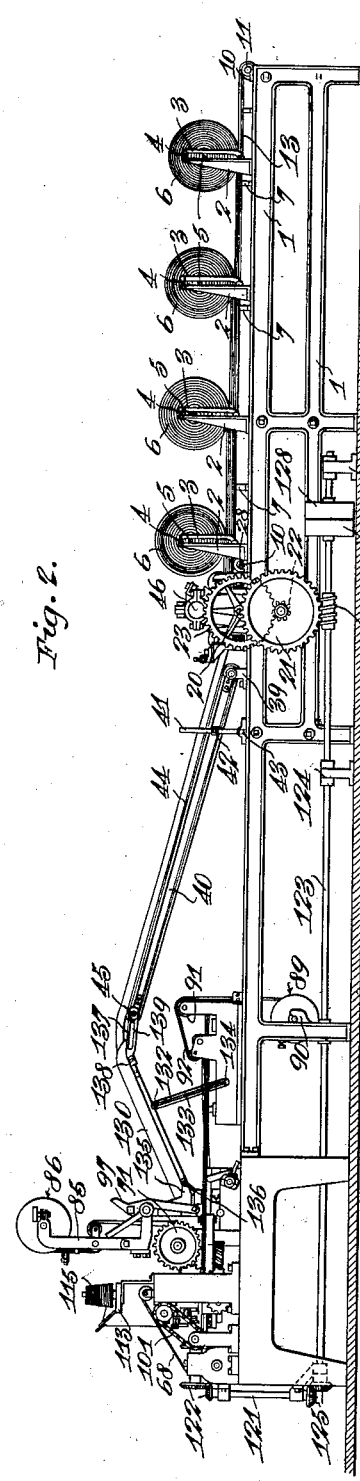
Fig. 2.
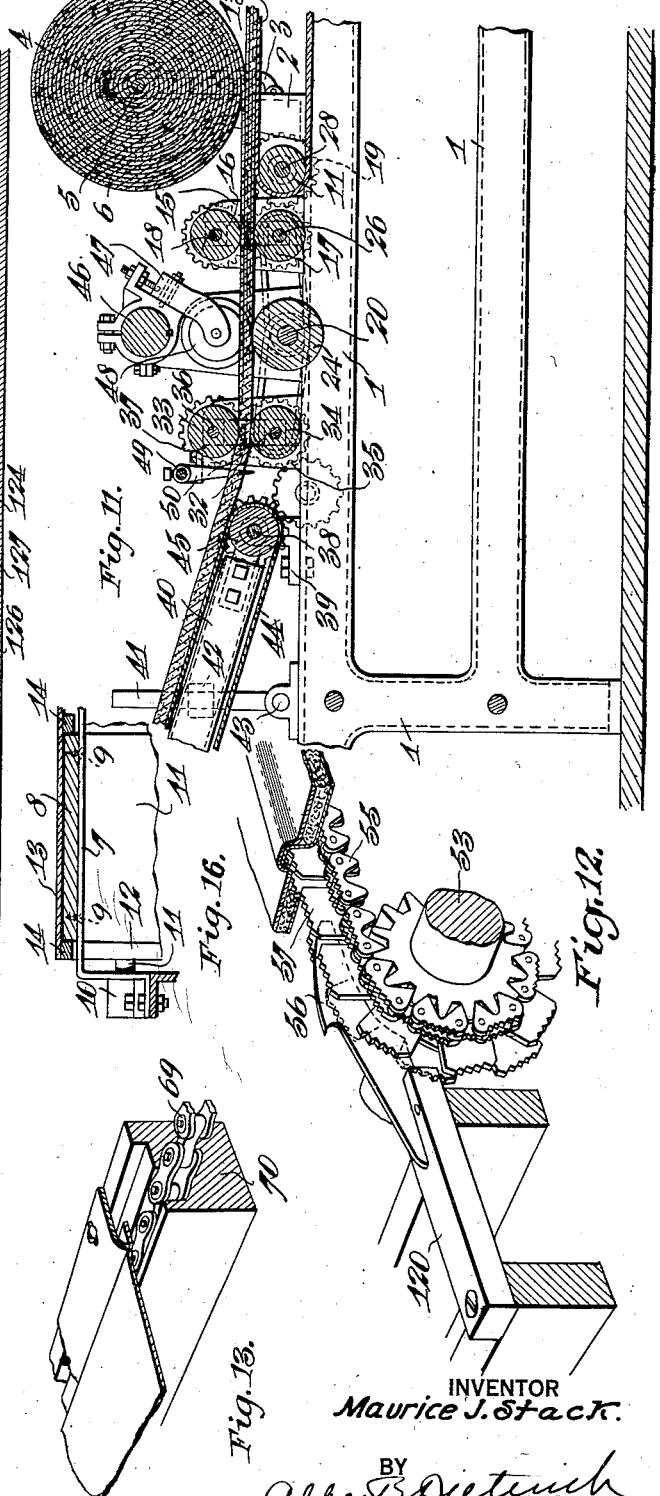
Fig. 11.
Fig. 16.
Fig. 13.
Fig. 12.
INVENTOR
Maurice J. Stack.
BY
Albert S Dietrich
ATTORNEY

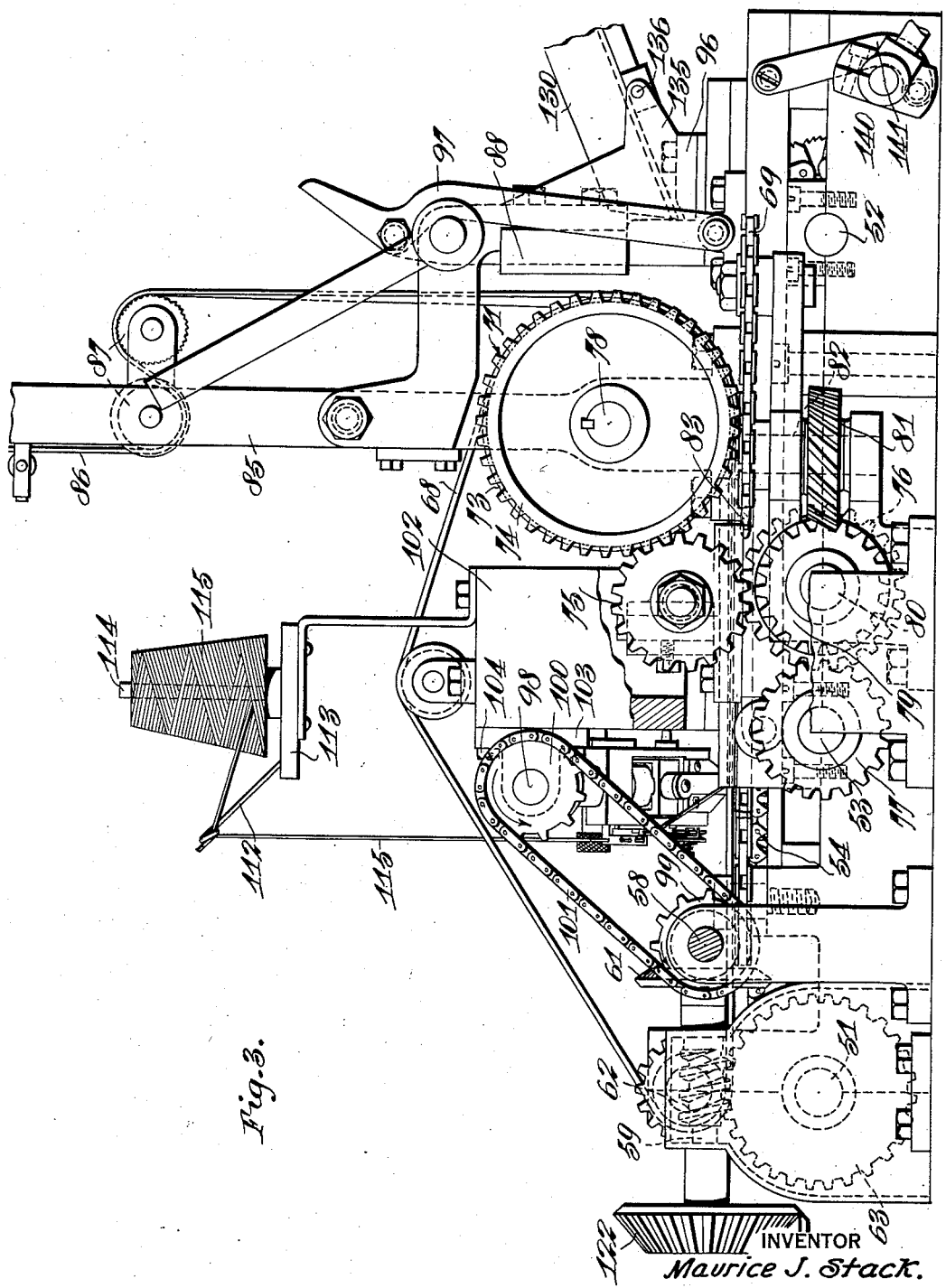

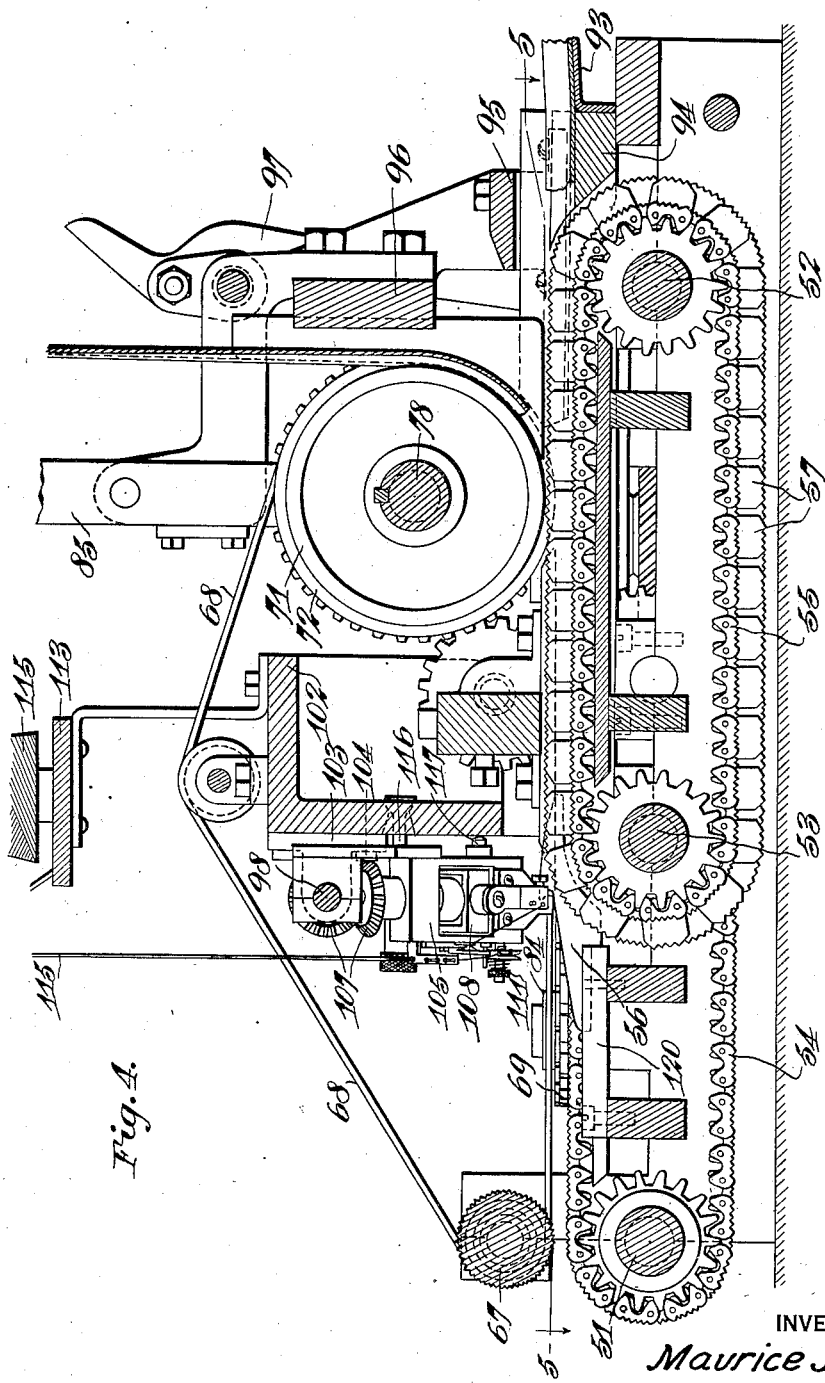

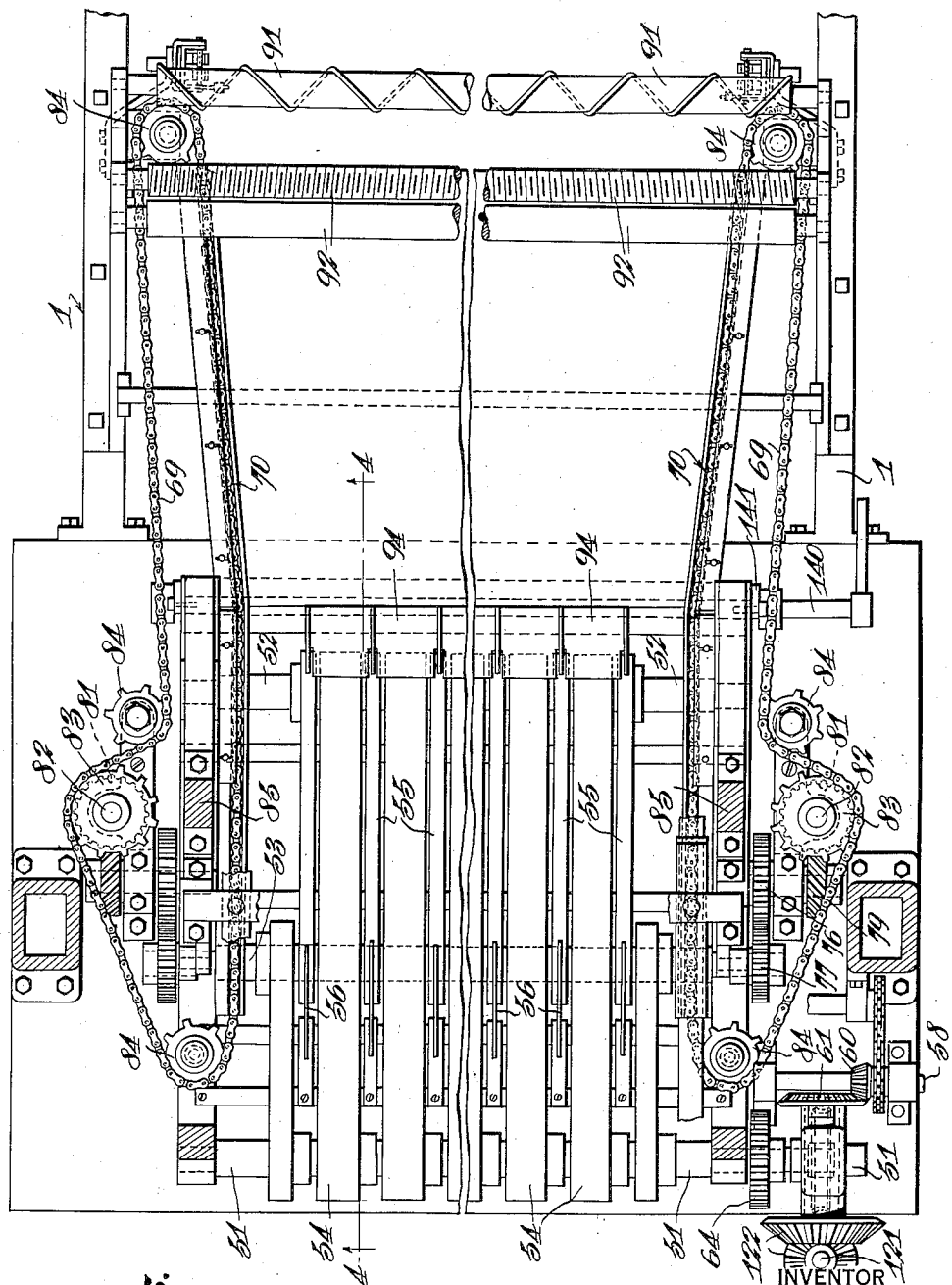

Feb. 17, 1931. M. J. STACK 1,793,139
MACHINE FOR AND METHOD OF MAKING CONTINUOUS CUSHIONS
Filed Nov. 18, 1927 8 Sheets-Sheet 6

INVENTOR
Maurice J. Stack.
BY
ATTORNEY

Feb. 17, 1931. M. J. STACK 1,793,139
MACHINE FOR AND METHOD OF MAKING CONTINUOUS CUSHIONS
Filed Nov. 18, 1927 8 Sheets-Sheet 7

INVENTOR
Maurice J. Stack.
BY
ATTORNEY

Feb. 17, 1931. M. J. STACK 1,793,139
MACHINE FOR AND METHOD OF MAKING CONTINUOUS CUSHIONS
Filed Nov. 18, 1927   8 Sheets-Sheet 8
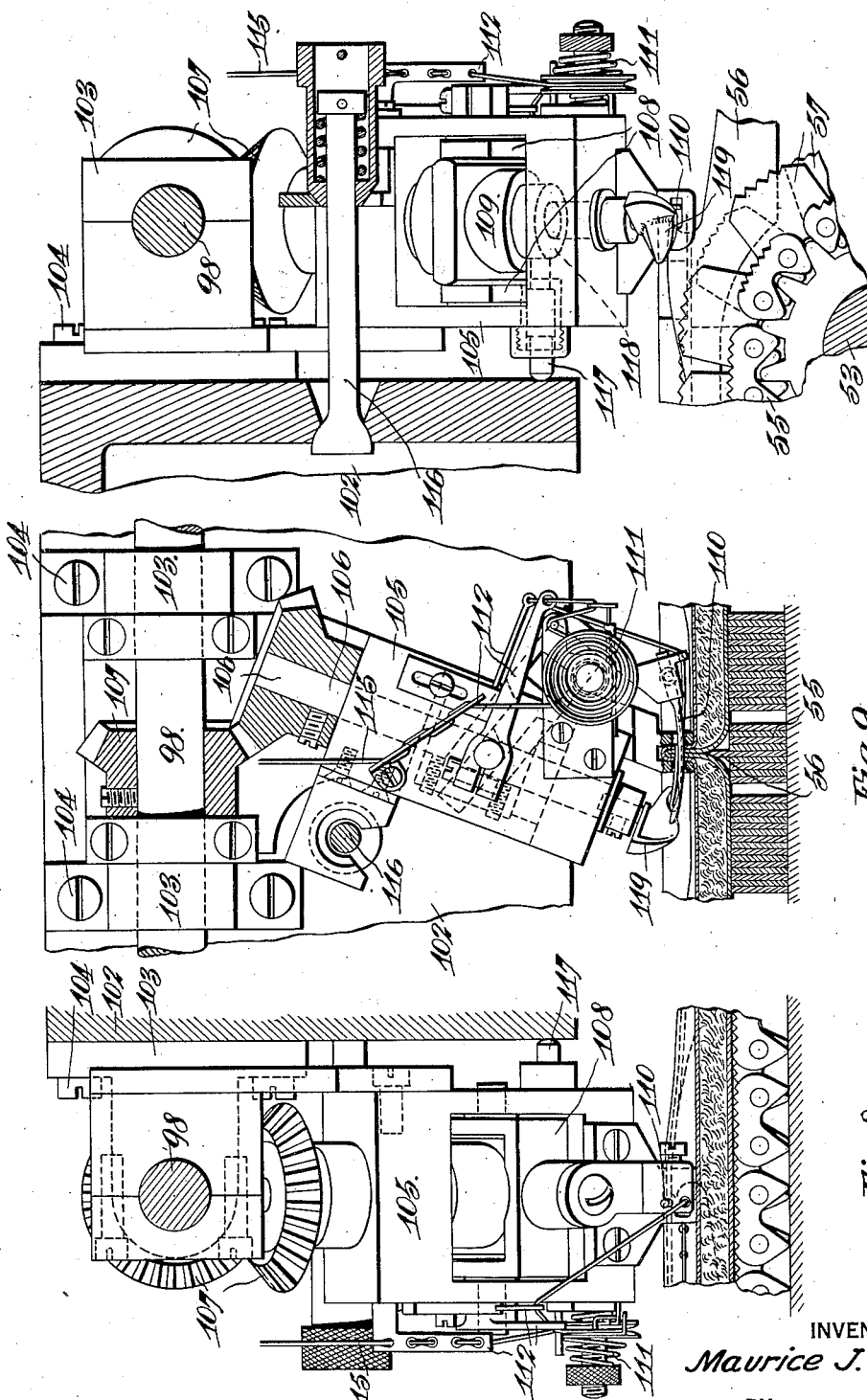
INVENTOR
Maurice J. Stack
BY
ATTORNEY Patented Feb. 17, 1931

1,793,139

UNITED STATES PATENT OFFICE

MAURICE JOSEPH STACK, OF COHOES, NEW YORK, ASSIGNOR, BY MESNE ASSIGNMENTS, TO NATIONAL AUTOMOTIVE FIBRES, INC., OF WILMINGTON, DELAWARE, A CORPORATION OF DELAWARE

MACHINE FOR AND METHOD OF MAKING CONTINUOUS CUSHIONS

Application filed November 18, 1927. Serial No. 234,282.

My invention relates to the art of upholstery making and it particularly has for its object to provide an improved method of and apparatus for making continuous upholstery cushions from which individual cushions may be cut off, and to make such cushions at the lowest possible cost and of the most uniform quality throughout.

Heretofore it has been proposed to make continuous upholstery cushions by taking a covering and a lining material and a plurality of separate or independent bats (one for each pleat or pocket) and form the same into a continuous cushion (see patent to Brintnall No. 1,498,013). Inasmuch as the bats occupy so much more volume than the thin sheets of covering and lining materials the rolls of bats give out very much sooner than the rolls of covering and lining materials. This requires the frequent stoppage of the machine in order to replace the exhausted rolls of bats.

Furthermore, since the bats are in separate rolls, there is no assurance that all rolls used are of the same quality, i. e. weight, texture, and materials, since bat rolls frequently vary. Thus, it may happen that a cushion may be formed which will not be of uniform quality, i. e., some of the pockets may contain a bat of inferior grade to others, some may be softer than others, due to variation in the bat stock.

My invention, therefore, has for an object to provide a method and means whereby shutting down of the machine in order to replace bat stock is made unnecessary.

Further, it is an object to provide a machine of such construction wherein the upholstery sewing mechanism, the bat sheet forming mechanism, the bat sheet separating mechanism, etc., etc., are so coordinated that if it becomes necessary to effect a stoppage of any one of these mechanisms the entire machine will stop so that when started up again the operations will take up again where they had left off, or in proper order as to relativity in time, place and materials.

Further, it is an object to provide a machine whereby production is increased and production costs reduced to a minimum, a machine of such construction that one attendant can take care of a number of machines.

Further, it is an object to provide means whereby the use of paper or other insert strips in the bats will become unnecessary, thereby further reducing manufacturing costs.

Other objects will in part be obvious and in part be pointed out hereinafter.

To the attainment of the aforesaid objects and ends, my invention consists in the novel details of construction and in the combination, connection and arrangement of parts, hereinafter more fully described and then pointed out in the claims.

In the drawings:

Figure 1 is a top plan view of the complete machine.

Figure 2 is a side elevation of the same.

Figure 3 is an enlarged side elevation of that portion of the machine showing the assembling and sewing mechanism.

Figure 4 is an enlarged longitudinal section on the line 4—4 of Figure 5.

Figure 5 is a horizontal section on the line 5—5 of Figure 4.

Figure 8 is an enlarged detail side elevation, showing one sewing unit in action.

Figure 9 is a front elevation of the parts shown in Figure 8, parts being shown in section.

Figure 10 is a side elevation of the unit shown in Figures 8 and 9, parts being in section.

Figure 11 is an enlarged vertical longitudinal section on the line 11—11 of Figure 1.

Figure 12 is a detail perspective view of a portion of the seam-forming mechanism.

Figure 13 is a detail perspective view of a portion of the lining and fabric material side feeding mechanism.

Figures 14 and 15 are detail perspective views of parts of the completed cushion.

Figure 16 is a detail sectional view of the conveyor belt showing the relation of it to the bridge bracket.

In the drawings in which like numerals of reference indicate like parts in all the figures, 1 represents the main frame of the machine which may be made in sections if desired.

Figure 6:
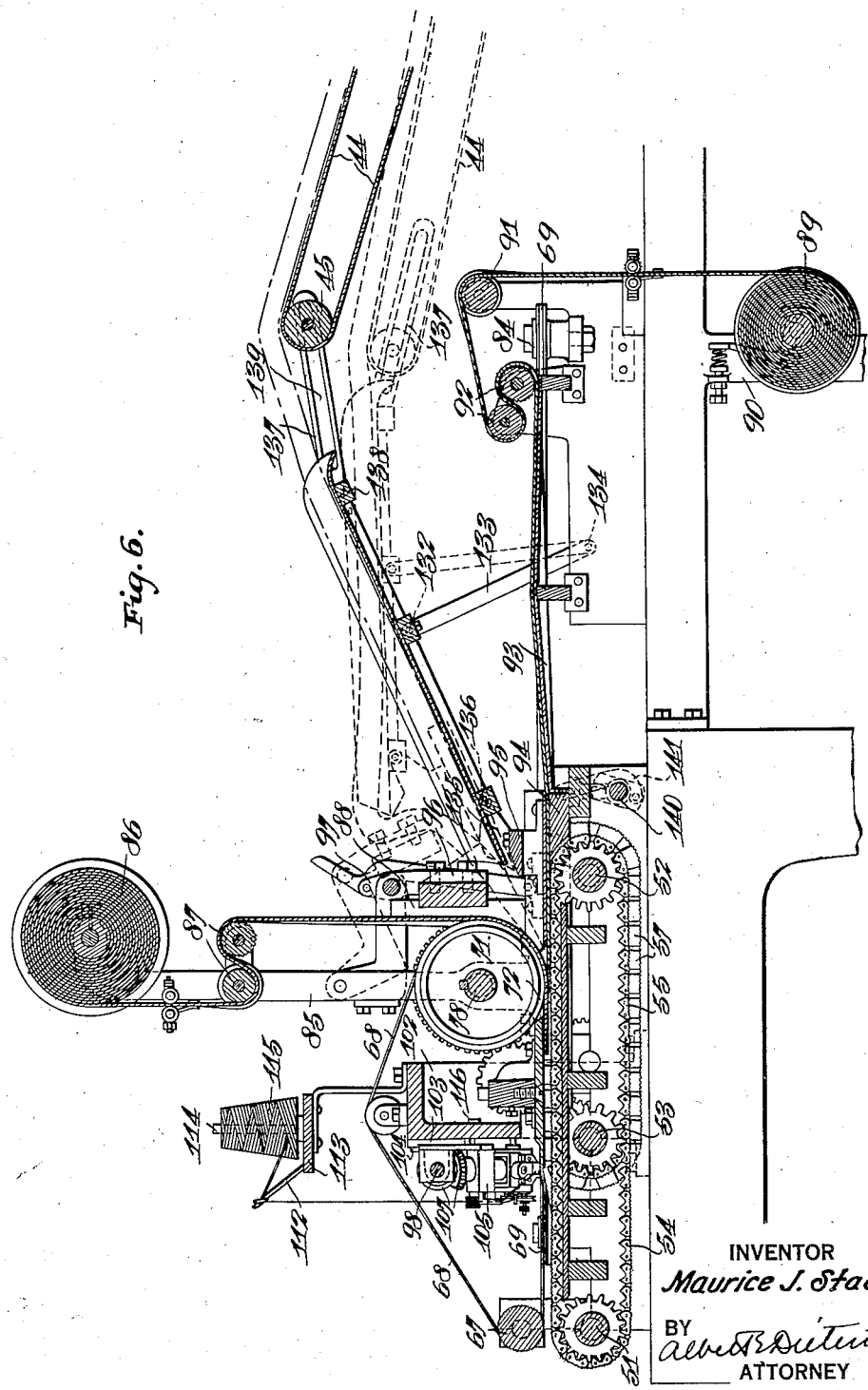
Figure 6 is a longitudinal section on the line 6—6 of Figure 1.
Figure 7:
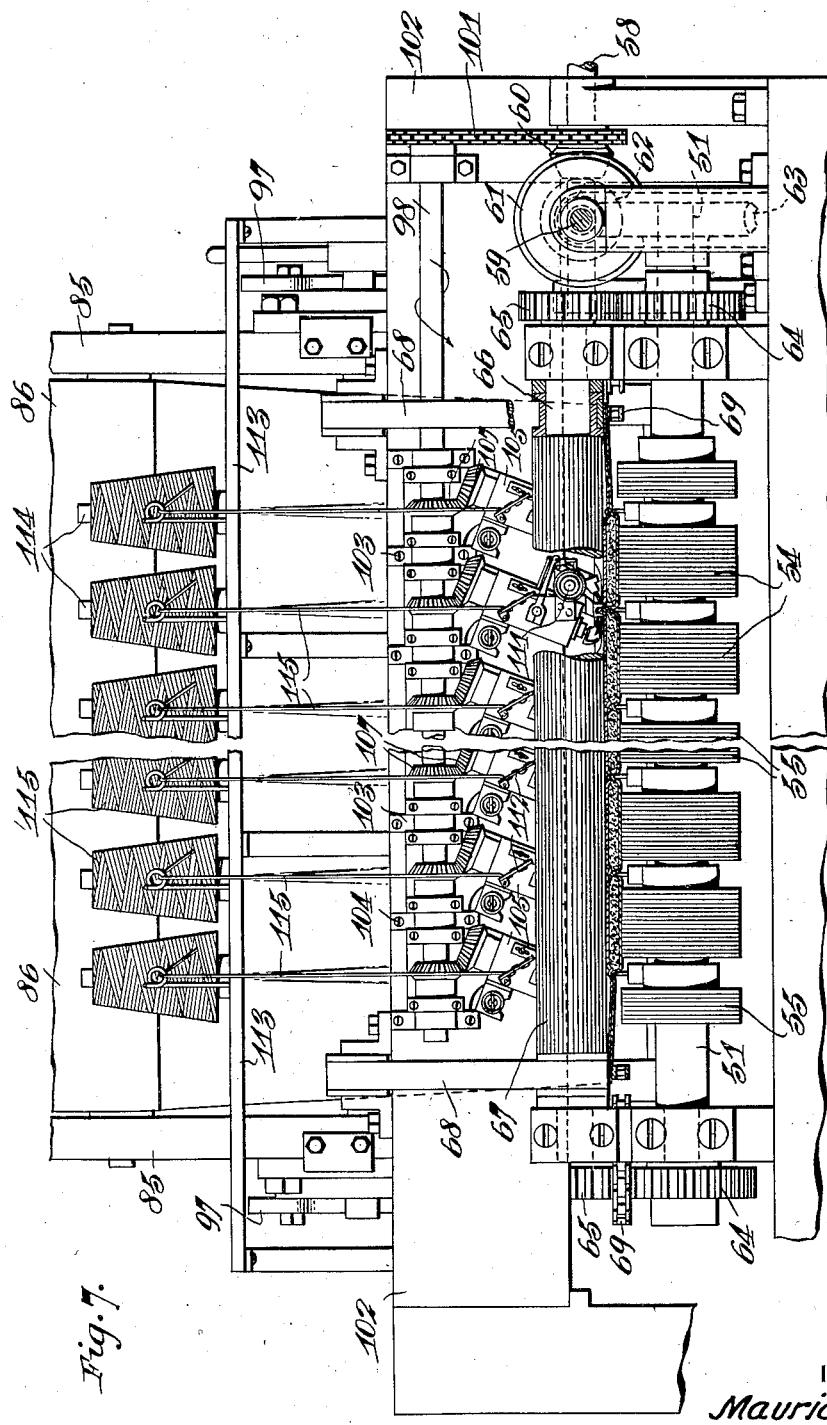
Figure 7 is an end elevation, parts being broken away, showing the sewing mechanism in particular.

Mounted on the main frame of the machine at one end is a series of standards 2—2 between which are placed the several rolls of loosely wound material such as cotton or hair of various grades as may be desired. The number of pairs of brackets 2—2 are optional and will depend upon the number of layers of material that will go into a given thickness of bat-sheet. The greater the number of rolls of material used the more uniform quality bat-sheet will be produced. As a practical proposition I have illustrated four sets of brackets 2—2 to carry four rolls of material.

Each bracket 2 has a hinged portion 3 that may be held by a link 4 to facilitate placing and removing the spindles 5 on which the material 6 is wound.

Located at suitable intervals on the main frame 1 are bridge brackets 7 which sustain floor strips 8 arranged longitudinally in parallelism but spaced apart a suitable distance for a purpose presently understood. The strips 8 are secured at 9 to the bridge brackets 7 as best indicated in Figure 16 of the drawings.

Mounted at suitable intervals are pairs of bearing members 10 in which the shafts of the conveyor pulleys 11—11 are journalled, one of the shafts 28 serving as a driving shaft. Taking round the rollers and overlying the floor strips 8 is a conveyor belt 13 having on its underside suitably spaced guide ribs 14 of leather, or other suitable material, the pulleys 11 being grooved at 12 for the reception of the guide ribs 14.

Mounted forwardly of the driving pulley 11 are bearing standards 15 in which the bearings 18 for the upper and lower primary feed rollers 16 and 17 are mounted.

The rollers 16 and 17 are connected together and to the drive shaft 28 of the conveyor 13 by a gear train 19.

Further forward from the primary feed rollers 16 and 17 is located another pair of feed rollers 33—34 whose bearings 36 are mounted in standards 35 similarly to the primary feeding rollers. Between the primary and secondary pairs of feeding rollers is located the cutting mechanism which divides the bat-sheet longitudinally, as it is formed, into a set of individual bat sections (hereinafter referred to as bats). This mechanism comprises a main shaft 20 carrying a driving gear 23 which is driven through a gear 22 carried on the same shaft as the master gear 21 hereinafter again referred to.

On the shaft 20 is mounted the anvil roller 24 of the cutting mechanism. The shaft 20 is also provided with a sprocket 25 over which a chain 27 passes, the chain also passing over a second sprocket 25 on the drive shaft 26 of the lower feed roller 17 so that the feed rollers 16 and 17 and the conveyor 13 are driven from the shaft 20. The shaft 20 is also utilized to drive the feed rollers of the second feeding mechanism. This is accomplished by means of a second sprocket 29 on the shaft 20 which, through a chain 31 and sprocket 30, drives the shaft 32 of the lower feed roller 34.

A gear train 37 between the shafts of the rollers 33—34 conveys power to the drive shaft 38 of the bat conveyor 44. The drive shaft 38 is mounted in bearing brackets 39 and on the shaft is also pivotally mounted a frame 40 which carries the idler pulley 45 at its free end. Around the upper and lower pulleys 45 the endless belt 44 is passed.

For adjustably holding the frame 40 in proper position there are provided standards 41 pivoted at 43 to the main frame and adjustably connected by a collar and set screw 42 to the frame 40.

Mounted over the anvil roller 24 of the cutting mechanism is a cross bar 46 on which the knife holders 47 are adjustably secured, the knife holders 47 carrying the rotary knives 48 which effect the longitudinal slitting or cutting of the bat-sheet into a plurality of parallel bats.

In order to break or sever any slight thread adhesion between the several bats as they pass the second feeding mechanism to go onto the conveyor 44, I provide a set of stationary dividing knives 50 which are adjustably mounted on a cross bar 49.

So far as described it will be understood that cotton or other suitable material from the laying machines is loosely wound in bales on suitable cores which are afterwards mounted in the machine by means of the spindles 5. A suitable number of these bales 6 to give the required thickness to the bat-sheet are mounted so that one lays its material upon the other as the material is conducted by the conveyor 13 to the feeding rollers 16—17 and 33—34. By the time the material reaches the rollers 16—17 it will be of the required thickness and in the form of a bat-sheet. As the sheet passes from the feeding rollers 16 and 17 toward the feeding rollers 33—34 it comes under the influence of the longitudinal slitting or cutting knives 48 which divide the bat-sheet into the required number of bat sections or bats (the number being variable depending upon the number of pockets to the upholstery). After passing through the second feeding mechanism the bats are separated and any slight adhesion broken by means of the slitting knives 49; they are then conveyed upwardly by the conveyor belt 44 to the assembling and sewing mechanism which will now be described.

The assembling and sewing mechanism

By referring now more particularly to Figures 3, 4 and 6 the mechanism for assembling the covering and lining materials and bats and sewing the covering and lining together, comprises a front conveyor shaft 51 and a rear conveyor shaft 52 between which is located an intermediate conveyor shaft 53, these shafts all being provided with sprockets over which the several feeder chains or conveyors 54 and 55 respectively are passed. The chains 55 serve not only as feeder but to give form to the seam of the fabric through which the sewing heads themselves pass Hereinafter the endless chain belt 54 will be referred to as the main feeder and the chain belt conveyor 55 will be referred to as the seam-forming feeder.

Adjacent the location of the sewing heads there is mounted a set of chain splitters and seam-forming blades 56, the purpose of which is to pass between the upstanding blade-like links 57 of the seam-forming feeder and as the covering and lining seam passes off the feeder, it will be drawn upwardly into a flat upstanding condition by the time the needles are ready to enter the fabric.

58 is the driving shaft of the sewing machine unit which is geared, through beveled gears 60 and 61, to a worm shaft 59, whose worm 62 meshes with the worm gear 63 on the shaft 51 that drives the main feeder and seam-forming feeder chain belts.

On the shaft 51 is a spur gear 64 which meshes with a spur gear 65 on the out-feed roller shaft 66 that gives motion to the out-feed roller 67.

At the sides of the machine are located the cushion covering and lining materials edge feeding belts 68 which pass around pulley portions on the shaft 66 and over idlers and around the drum 71, the belts 68 cooperating with edge feeding chains 69 that run in guide-ways 70.

71 designates the cover feeding drum which is provided at intervals with grooves 72 to cooperate with the seam-forming feeders 55 and seam-presser plates 88 to give form to the seams prior to their passage over the seam-forming blades 56.

The cover feeding drum 71 has grooves 73 in which the belts 68 lie.

The shaft 78 of the drum 71 receives its motion through a gear train 74, 75, 76 and 77 from the intermediate conveyor shaft 53.

80 designates a stub shaft on which the gear 76 is mounted, there being a worm gear 79 also mounted on that shaft to mesh with a worm gear 81 on the shaft 82 which carries the sprocket 83 that drives the edge-feeding chain (it is, of course, understood that this mechanism is duplicated on the other side of the machine).

Idler sprockets 84 are provided around which the chain 69 passes.

A stand 85 is provided to carry the roll of lining material 86, suitable guide rollers 87 being provided to maintain tension and effect proper delivery of the lining material to the drum 71.

The roll 89 of covering material is placed on a suitable stand 90 and passes over guide rollers 91 and 92, certain of these rollers being provided with reversely directed spiral or thread-like members to maintain the covering material smooth from side to side.

After passing the rollers 92 the covering material passes over a table 93 and over a lower cover guide and pleat-forming plate 94 and under a cooperating guide and pleat-forming plate 95, the latter being mounted on a holder 96 that is pivoted to the stand 85 so that it may be swung up to the dot and dash position indicated in Figure 6 when it is desired to start the covering material under the drum 71, a suitable toggle lever lock 97 being provided for the purpose of holding the member 95 down or up as may be desired.

98 designates the sewing units' drive shaft which is driven from the shaft 58 by means of sprockets 99 and 100 and chain 101. The drive shaft 98 is mounted in suitable bearings 103 that are secured at 104 to the support 102.

105 designates the sewing head units, there being one for each seam to be sewn and each unit includes the needle and looper operating shaft 106 that is driven by bevelled pinions 107 from the shaft 98. Each unit also includes the needle oscillating arm 108 that is actuated by the cam 109, the arm carrying the needle 110. Suitable tension devices 111 and thread guides 112 are provided for the usual purposes.

The thread carrying spindles 114 are mounted on a bridge 113 above the sewing units, the thread 115 passing downwardly through the several guides 112 and tension means 111 to the needle.

The sewing units have their heads pivotally mounted on the shaft 98 so that they may move forwardly with the moving covering and lining materials and this forward motion is given at the proper intervals by means of a push pin 117 and cam 118, a resilient hold-back device 116 being provided for maintaining contact between push pin 117 and the support and for the further purpose of returning the unit to its starting position after each operation of the needle. A looper 119 of suitable construction is mounted on the lower end of the shaft 116 and cooperates with the needle 110.

Forwardly of the sewing heads is located a suitable table structure 120 composed of bars located between adjacent chain conveyors 54 and supporting the members 56.

121 is a vertical power shaft connected with the worm shaft 59 by means of beveled gears 122. The shaft 121 is also connected by means of beveled gears 125 with a line shaft 123 that is mounted in suitable bearings 124 and has a worm 126 to mesh with the worm gear 21, fast and loose pulleys 127 and 128 respectively being provided for driving purposes.

The seams of the cushion are designated by 129 and appear best in Figures 14 and 15 of the drawings.

The assembling and sewing mechanism just described and illustrated in the drawings per se is not of my invention and is shown and described only for purposes of illustration as other constructions for the purpose may be employed if desired. My invention does not reside in this specific assembling and sewing mechanism per se but in the combination of such a mechanism with the mechanism for preparing and forming the bat and delivering it to the assembling mechanism in such a cooperative and interdependent way that a continuous operation may take place.

It is obvious that for a given diameter roll of material the space occupied by the covering and lining material rolls is very much less than the space that would have to be provided for a roll of bat material of sufficient length to equal the length of the covering and lining materials. The covering and lining materials are approximately a thirty-secondth of an inch thick while the thickness of the batting material is approximately three-fourths of an inch or more. Thus it will be seen it is impracticable to use rolls of batting material containing a sufficient length of that material to supply a given maximum length of covering and lining materials and enable the continuous operation of the machine. For this reason the rolls of bat forming materials are of considerably less length than the rolls of covering and lining materials but by arranging them as shown and forming the bats in the manner described the several rolls of bat-constituting material may be arranged to run out successively. An attendant observing one roll about to terminate will have sufficient time to replace it with a fresh roll before the next succeeding one is about to terminate, thereby enabling the continuity of the formed bat-sheet to be continued unbroken and enabling the machine to run continuously so long as the covering and lining materials hold out.

It is possible to use rolls of covering and lining materials in almost any length desired up to say one hundred feet or more.

When the materials leave the out-feed rollers 67 the continuous cushion may be fed into a die cutter and individual cushions cut from it, or it may be rolled up for packing and shipment in any length desired.

From the foregoing it will be noted that by the use of my machine the continuous cushion will be formed in such a way that it will be of uniform construction throughout its entire length, whereas under the old practice of feeding individual bats from individual bat rolls to the assembling and sewing mechanism, no assurance could be given that the continuous cushion would be of uniform characteristics throughout its length owing to variations in the bat rolls,—variations not only in thickness and density of the stock but in the stock material itself.

In order properly to direct the bats into the respective pockets of the forming cushion there is provided a chute 130 having longitudinal upstanding partitions 131 forming a series of channels for the respective bats. This chute 130 is pivotally mounted at 132 on link arms 133 which are pivoted at 134 to a fixed part of the machine. The holder 96 is also provided with extensions 135 which are pivoted at 136 to the chute 130 so that when the toggle mechanism 97 is moved to elevate the covering material upper guide and seam-forming plate 95 in order to enable a new roll of covering material to be started beneath the drum 71, that operation of elevating the member 95 will also move the chute 130 to the dot and dash position shown in Figure 6. This movement it will be noted, has a tendency at the front end of the chute 130 to pull up on the cotton bat, so in order to give sufficient slack for this movement to take place I preferably connect the upper end of the conveyor frame 40 to the chute 130 by means of arms 137 which are rigidly secured at 138 to the chute and have slots 139 to receive the ends of the shaft of the upper roller 45 and thereby effect a sliding and pivotal connection with the same.

I have thus provided a means whereby without breaking the continuity of the continuous bat a new roll of covering material 89 may be started as the old roll runs out. The attendant observing the roll 89 to be near its end, as soon as the roll 89 has its end about unwound from the bobbin or core, removes the old roll and immediately puts a new roll in place. By the time the end of the first roll has reached the member 94, the attendant will have had sufficient opportunity to thread the new length of covering material over the rollers 91 and 92 and pass it along the table 93 to fall in back of the previous length of material. As soon as the end of the first roll reaches the drum 71, the attendant stops the machine for a moment, moves the toggle 97 to elevate the member 95, after having first loosened the set screws 42, which tilts the chute 130 to the dot and dash position shown in Figure 6 and lowers the conveyor frame 40, thereby giving the necessary slack to the cotton bat to enable the elevation of the member 95 without the necessity of breaking the continuity of the bat. As soon as the attendant has started the new length of covering material, the toggle 97 is restored to the full line position shown in Figure 6 and the machine will be ready to start up again.

When the lining material roll 86 is about to give out the attendant can replace it during the time the end of the roll is passing to the drum 71 and have the end of the new roll ready to start around the drum 71 as soon as the end of the old roll is about to leave that drum. When that point is reached the machine is temporarily stopped and the frame 85 with drum 71 is elevated by the shaft and toggle link mechanism 140—141 operated through the medium of the lever 142, thus enabling the lining material to be started under the drum 71 and upon restoration of the parts 140—141 to the normal position the drum 71 is lowered and the machine is ready to start up again. In no case is it necessary to break the continuity of the bat. Furthermore, by this arrangement the time required to replace the covering and lining material with fresh rolls is reduced to the minimum.

From the foregoing description, taken in connection with the accompanying drawings, it is thought the complete construction, operation and advantages of my invention will be clear to those skilled in the art to which it relates.

What I claim is:

1. In upholstery making machines, the combination of a sewing mechanism, a means for feeding covering and lining materials to th sewing mechanism and forming pleats or pockets between said covering and lining materials, of means for forming and delivering continuous bats to the pockets being formed, said delivering means comprising an endless conveyor and a chute, and means cooperative with said chute and conveyor for moving the same out of the way to enable the starting of new covering material without breaking the continuity of the bats.

2. In upholstery machines, the combination of means for forming loose batting material into a continuous bat-sheet, means for continuously sewing a lining and a covering material together along parallel spaced lines to form pipes, means for dividing the bat-sheet into a series of individual bats corresponding in number to the number of pipes, means to deliver lining and covering materials continuously to said sewing means, means for simultaneously delivering the bats as formed to and between said covering and lining materials in spaced relation to fill the pipes, and means to coordinate the actions of all of the aforesaid means whereby from continuous lengths of covering and lining materials and loose batting material continuous cushions are produced, said means for delivering bats and said coordinating means including a bat conveyor, a directing chute, and means for simultaneously moving said chute and conveyor to an inoperative position without breaking the continuity of the bats.

MAURICE JOSEPH STACK.